US012698976B2

(12) United States Patent
Karlapalem et al.

(10) Patent No.: US 12,698,976 B2
(45) Date of Patent: Aug. 4, 2026

(54) SYSTEM AND METHOD FOR GENERATING SCENIC ROUTES THROUGH WEIGHTED 2D POINTS CORRESPONDING TO VIRTUAL ENVIRONMENT

(71) Applicant: International Institute of Information Technology, Hyderabad, Hyderabad (IN)

(72) Inventors: Kamalakar Karlapalem, Hyderabad (IN); Vijayraj Shanmugaraj, Hyderabad (IN); Lini Thomas, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 166 days.

(21) Appl. No.: 18/731,299

(22) Filed: Jun. 2, 2024

(65) Prior Publication Data

US 2024/0401960 A1      Dec. 5, 2024

(30) Foreign Application Priority Data

Jun. 2, 2023      (IN) .............................. 202341038066

(51) Int. Cl.
*G01C 21/34*          (2006.01)
*G06T 11/26*          (2026.01)

(52) U.S. Cl.
CPC .......... *G01C 21/3476* (2013.01); *G06T 11/26* (2026.01); *G06T 2210/21* (2013.01)

(58) Field of Classification Search
CPC .............. G01C 21/3476; G06T 11/206; G06T 2210/21
See application file for complete search history.

(56) References Cited

FOREIGN PATENT DOCUMENTS

CN          105043379 B   *   6/2018   ............. G01C 21/00
CN          115235495 A   *  10/2022   ......... G01C 21/3641

* cited by examiner

*Primary Examiner* — Navid Z. Mehdizadeh
*Assistant Examiner* — Oliver Tan

(57) ABSTRACT

A method for generating scenic routes through weighted two-dimensional (2D) points to visualize a movement of a user through the scenic routes with scenic views corresponding to a virtual environment is provided. The method includes (i) receiving input data from an input data source, (ii) determining one or more scenic points in the input data, (iii) generating one or more scenic paths for each scenic point of each pair of points based on a first condition, (iv) generating a scenic graph by aggregating intersection points and edges of each scenic path, and (v) generating the scenic routes by applying any one of one or more route-generating methods on the scenic graph based on a second condition to visualize the movement of the user through the scenic routes with the scenic views corresponding to the virtual environment.

20 Claims, 7 Drawing Sheets

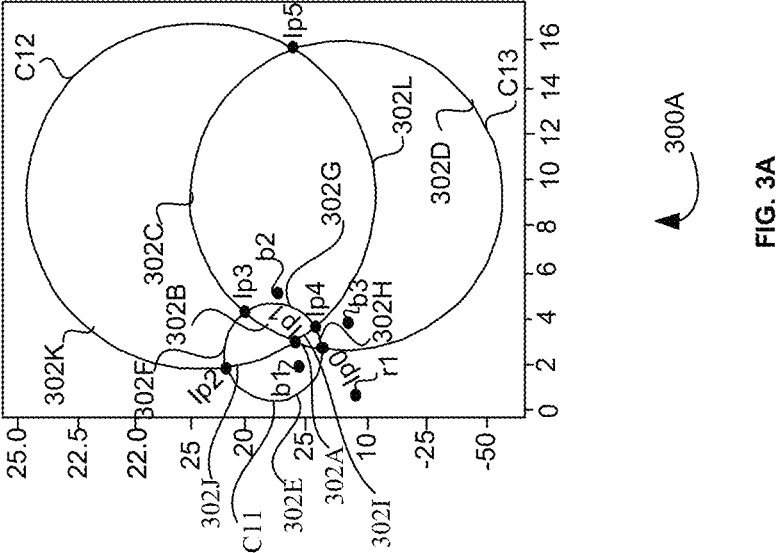
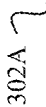
FIG. 3A

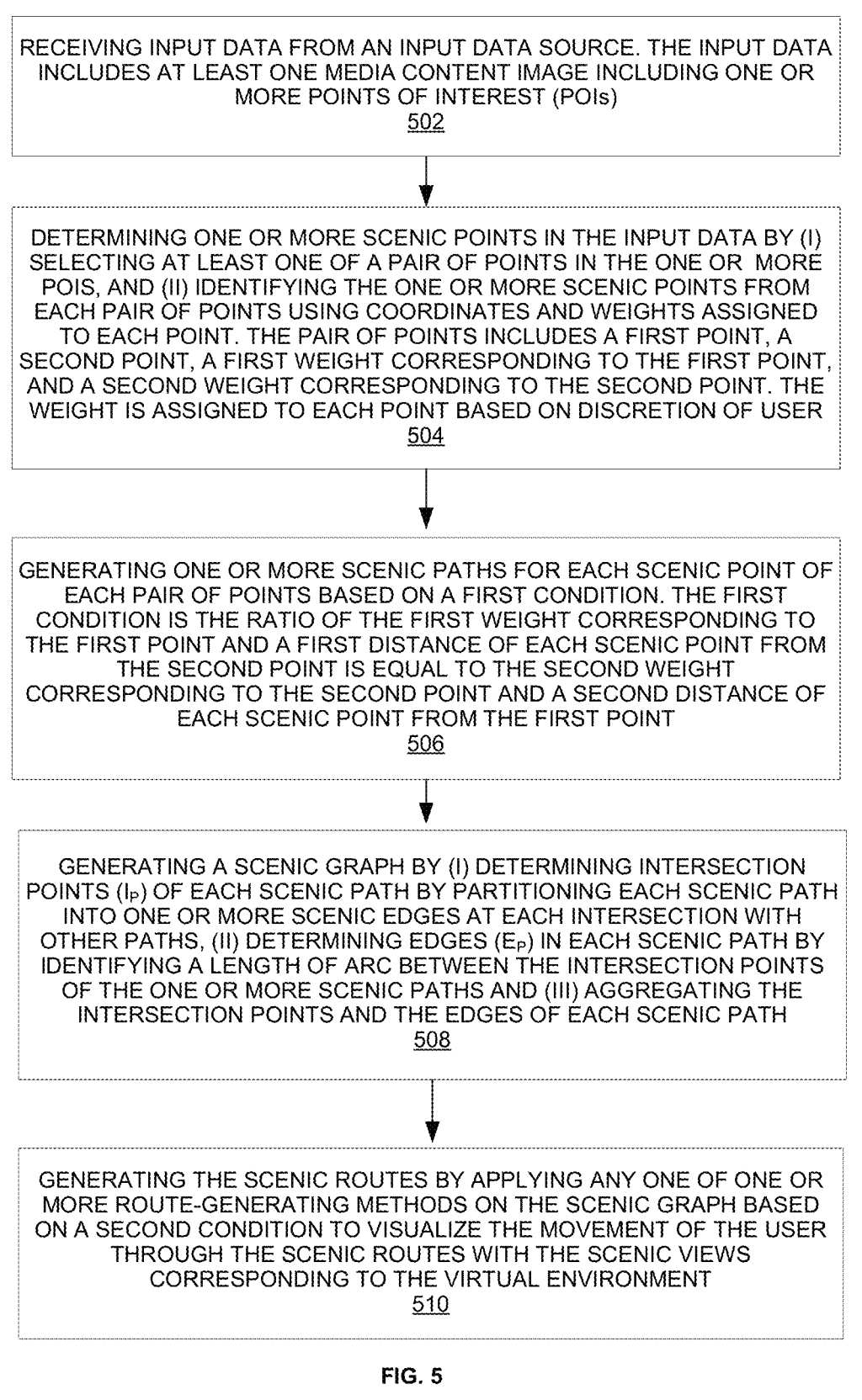

RECEIVING INPUT DATA FROM AN INPUT DATA SOURCE. THE INPUT DATA INCLUDES AT LEAST ONE MEDIA CONTENT IMAGE INCLUDING ONE OR MORE POINTS OF INTEREST (POIs)
502

DETERMINING ONE OR MORE SCENIC POINTS IN THE INPUT DATA BY (I) SELECTING AT LEAST ONE OF A PAIR OF POINTS IN THE ONE OR MORE POIS, AND (II) IDENTIFYING THE ONE OR MORE SCENIC POINTS FROM EACH PAIR OF POINTS USING COORDINATES AND WEIGHTS ASSIGNED TO EACH POINT. THE PAIR OF POINTS INCLUDES A FIRST POINT, A SECOND POINT, A FIRST WEIGHT CORRESPONDING TO THE FIRST POINT, AND A SECOND WEIGHT CORRESPONDING TO THE SECOND POINT. THE WEIGHT IS ASSIGNED TO EACH POINT BASED ON DISCRETION OF USER
504

GENERATING ONE OR MORE SCENIC PATHS FOR EACH SCENIC POINT OF EACH PAIR OF POINTS BASED ON A FIRST CONDITION. THE FIRST CONDITION IS THE RATIO OF THE FIRST WEIGHT CORRESPONDING TO THE FIRST POINT AND A FIRST DISTANCE OF EACH SCENIC POINT FROM THE SECOND POINT IS EQUAL TO THE SECOND WEIGHT CORRESPONDING TO THE SECOND POINT AND A SECOND DISTANCE OF EACH SCENIC POINT FROM THE FIRST POINT
506

GENERATING A SCENIC GRAPH BY (I) DETERMINING INTERSECTION POINTS ($I_P$) OF EACH SCENIC PATH BY PARTITIONING EACH SCENIC PATH INTO ONE OR MORE SCENIC EDGES AT EACH INTERSECTION WITH OTHER PATHS, (II) DETERMINING EDGES ($E_P$) IN EACH SCENIC PATH BY IDENTIFYING A LENGTH OF ARC BETWEEN THE INTERSECTION POINTS OF THE ONE OR MORE SCENIC PATHS AND (III) AGGREGATING THE INTERSECTION POINTS AND THE EDGES OF EACH SCENIC PATH
508

GENERATING THE SCENIC ROUTES BY APPLYING ANY ONE OF ONE OR MORE ROUTE-GENERATING METHODS ON THE SCENIC GRAPH BASED ON A SECOND CONDITION TO VISUALIZE THE MOVEMENT OF THE USER THROUGH THE SCENIC ROUTES WITH THE SCENIC VIEWS CORRESPONDING TO THE VIRTUAL ENVIRONMENT
510

FIG. 5

SYSTEM AND METHOD FOR GENERATING SCENIC ROUTES THROUGH WEIGHTED 2D POINTS CORRESPONDING TO VIRTUAL ENVIRONMENT

CROSS-REFERENCE TO RELATED APPLICATIONS

This patent application claims priority to pending Indian provisional patent application no. 202341038066 filed on Jun. 2, 2023, the complete disclosures of which, in their entirety, are hereby incorporated by reference.

BACKGROUND

Technical Field

The embodiments herein generally relate to route-finding methods, more particularly, a system and method for generating scenic routes in two-dimensional (2D) space through weighted 2D points to visualize a movement of a user through the scenic routes with scenic views corresponding to a virtual environment.

Description of the Related Art

Humans have an implicit awareness of scenic beauty when traveling over various routes. The scenic beauty is defined within the context of a user and a set of viewpoints. Given a context, scenic beauty is defined to be a uniform and balanced view of points of interest. In order to transfer the scenic awareness, it is important to find scenic routes in 2-dimensional space.

Moreover, it is essential that the scenic routes satisfy a set of route-generating conditions including (i) only scenic: a route must consist of scenic paths and does not contain non-scenic (distracting) paths, (ii) completeness: traveling on the route must allow one to have a view of a large number of first-second pairs or all first-second pairs, (iii) minimal edges: the route must not have a large number of edges and a large number of direction changes within the route, (iv) minimal repeated edges: the route must contain a minimal number of repeated edges, where the repeated edges are defined as stretches of paths that must be travelled more than once (repeated) to complete the entire route, and (v) minimal route length: the total route length that is the sum of all edges that are part of the route should be as low as possible.

Many scenic route-finding methods that apply graph traversals to generate scenic points and routes are available in the market. For example, a depth-first search/breadth-first search traversals algorithm forces a user to traverse a given edge in a graph multiple times. Dijkstra's algorithm provides the shortest route. However, this algorithm does not ensure that the edges from all scenic paths are incorporated into the route. The convex hull algorithm on the graph vertices combined with the all-pair-shortest path algorithm provides the user with a closed route, however, this algorithm does not ensure that edges from all scenic paths are incorporated into the route, and sometimes the routes generated might be too long.

Therefore, there arises a need to address the aforementioned technical drawbacks in the existing methods in finding scenic routes satisfying the set of routes generating conditions in the 2-dimensional space.

SUMMARY

In view of the foregoing, an embodiment herein provides a processor-implemented method for generating scenic routes through weighted two-dimensional (2D) points to visualize a movement of a user through the scenic routes with scenic views corresponding to a virtual environment. The method includes receiving input data from an input data source. The input data includes at least one media content image including one or more points of interest (POIs). The method includes determining one or more scenic points in the input data by (i) selecting at least one of a pair of points in the one or more POIs, and (ii) identifying the one or more scenic points from each pair of points using coordinates and weights assigned to each point. The pair of points includes a first point, a second point, a first weight corresponding to the first point, and a second weight corresponding to the second point. The weight is assigned to each point based on a discretion of a user. The method includes generating one or more scenic paths for each scenic point of each pair of points based on a first condition. The first condition is the ratio of the first weight corresponding to the first point and a first distance of each scenic point from the second point is equal to the second weight corresponding to the second point and a second distance of each scenic point from the first point. The method includes generating a scenic graph by (i) determining intersection points ($I_p$) of each scenic path by partitioning each scenic path into one or more scenic edges at each intersection with other paths, (ii) determining edges ($E_p$) in each scenic path by identifying a length of arc between the intersection points of the one or more scenic paths and (iii) aggregating the intersection points and the edges of each scenic path. The method includes generating the scenic routes by applying any one of one or more route-generating methods on the scenic graph based on a second condition to visualize the movement of the user through the scenic routes with the scenic views corresponding to the virtual environment. The scenic view is an apparent weight of each scenic point. The apparent weight is equal to an actual weight of each scenic point in the scenic route by dividing a distance of the user from each scenic point in the scenic route.

In some embodiments, the second condition corresponding to the plurality of route-generating methods includes at least one of a plurality of conditions. In some embodiments, the plurality of conditions includes (i) a route comprising scenic paths and non-scenic paths, (ii) the route includes viewable pairs of points, (iii) the route includes minimum number of scenic edges and directional changes, (iv) the route include a minimum number of repeated scenic edges means minimizing the number scenic edges that are traversed multiple times to complete the scenic route, and (v) the route includes a shortest path by summing a combination of scenic edges with the shortest path to the scenic route. In some embodiments, the plurality of route-generating methods prioritizes the plurality of conditions.

In some embodiments, the method further includes generating, using a first route-generating method, the scenic routes by (i) selecting the combination of scenic edges with the shortest path from each scenic path, and (ii) constructing a convex hull to vertices in the combination of scenic edges.

In some embodiments, the one or more scenic points are selected when a distance of a scenic point from a POI is indirectly proportional to the weight of the corresponding POI.

In some embodiments, the method further includes generating, using a second route-generating method, the scenic routes by (i) selecting the one or more scenic points within the scenic graph in descending order of degree of intersection points, which is the number of scenic edges terminating at each scenic point if the one or more scenic points within the scenic graph includes different degrees, and (ii) constructing a convex hull to vertices of the selected scenic points.

In some embodiments, the method further includes generating, using a third route-generating method, the scenic routes by (i) calculating a centroid of the one or more scenic points in the scenic graph, (ii) assigning the one or more scenic points in a circular order to the centroid, and (iii) connecting the one or more scenic points in the circular order with the shortest path between each scenic point.

In some embodiments, the third route-generating method selects the one or more scenic points within the scenic graph in the descending order of degree which is the number of scenic edges terminating at each scenic point if the one or more scenic points within the scenic graph includes the same degree.

In some embodiments, the method further includes generating a circle scenic path if the weights assigned to each pair of points are different. The method includes generating a line scenic path if the weights assigned to each pair of points are equal.

In some embodiments, the method further includes determining disconnected components within the scenic graph when edges in a first point in the scenic path are not linked to any edge in a second point in the scenic path. The disconnected component is a portion of the scenic graph where the vertices and edges of the scenic path are not connected to the scenic graph.

In some embodiments, the method further includes adding one or more additional vertices and one or more additional edges to connect the disconnected components with the scenic graph by applying a scenic component bridging method on the generated scenic graph if the scenic graph has the disconnected components.

In some embodiments, the method further includes computing the shortest path using the Floyd-Warshall all-pairs shortest path method. The shortest path is computed by calculating a distance between two points that are selected from precomputed intersection points and edges of each scenic graph of the Floyd-Warshall all-pairs shortest path method.

In one aspect, a system for generating scenic routes through weighted two-dimensional (2D) points to visualize a movement of a user through the scenic routes with scenic views corresponding to a virtual environment. The system includes a scenic route generating server. The scenic route generating server receives input data from an input data source. The input data includes at least one media content image including one or more points of interest (POIs). The scenic route generating server includes a memory that stores a set of instructions and a processor that executes the set of instructions. The processor is configured to determine one or more scenic points in the input data by (i) selecting at least one of a pair of points in the one or more POIs, and (ii) identifying the one or more scenic points from each pair of points using coordinates and weights assigned to each point. The pair of points includes a first point, a second point, a first weight corresponding to the first point, and a second weight corresponding to the second point. The weight is assigned to each point based on a discretion of a user. The processor is configured to generate one or more scenic paths for each scenic point of each pair of points based on a first condition. The first condition is the ratio of the first weight corresponding to the first point and a first distance of each scenic point from the second point is equal to the second weight corresponding to the second point and a second distance of each scenic point from the first point. The processor is configured to generate a scenic graph by (i) determining intersection points ($I_p$) of each scenic path by partitioning each scenic path into one or more scenic edges at each intersection with other paths, (ii) determining edges ($E_p$) in each scenic path by identifying a length of arc between the intersection points of the one or more scenic paths and (iii) aggregating the intersection points and the edges of each scenic path. The processor is configured to generate the scenic routes by applying any one of one or more route-generating methods on the scenic graph based on a second condition to visualize the movement of the user through the scenic routes with the scenic views corresponding to the virtual environment. The scenic view is an apparent weight of each scenic point. The apparent weight is equal to an actual weight of each scenic point in the scenic route by dividing a distance of the user from each scenic point in the scenic route.

In some embodiments, the second condition corresponding to the plurality of route-generating methods includes at least one of a plurality of conditions. In some embodiments, the plurality of conditions includes (i) a route comprising scenic paths and non-scenic paths, (ii) the route includes viewable pairs of points, (iii) the route includes minimum number of scenic edges and directional changes, (iv) the route include a minimum number of repeated scenic edges means minimizing the number scenic edges that are traversed multiple times to complete the scenic route, and (v) the route includes a shortest path by summing a combination of scenic edges with the shortest path to the scenic route. In some embodiments, the plurality of route-generating methods prioritizes the plurality of conditions.

In some embodiments, the processor is configured to generate, using a first route-generating method, the scenic routes by (i) selecting the combination of scenic edges with the shortest path from each scenic path, and (ii) constructing a convex hull to vertices in the combination of scenic edges.

In some embodiments, the one or more scenic points are selected when a distance of a scenic point from a POI is indirectly proportional to the weight of the corresponding POI.

In some embodiments, the processor is configured to generate, using a second route-generating method, the scenic routes by (i) selecting the one or more scenic points within the scenic graph in descending order of degree of intersection points, which is the number of scenic edges terminating at each scenic point if the one or more scenic points within the scenic graph includes different degrees, and (ii) constructing a convex hull to vertices of the selected scenic points.

In some embodiments, the processor is configured to generate, using a third route-generating method, the scenic routes by (i) calculating a centroid of the one or more scenic points in the scenic graph, (ii) assigning the one or more scenic points in a circular order to the centroid, and (iii) connecting the one or more scenic points in the circular order with the shortest path between each scenic point.

In some embodiments, the third route-generating method selects the one or more scenic points within the scenic graph in the descending order of degree which is the number of scenic edges terminating at each scenic point if the one or more scenic points within the scenic graph includes the same degree.

In some embodiments, the processor is configured to generate a circle scenic path if the weights assigned to each pair of points are different. The method includes generating a line scenic path if the weights assigned to each pair of points are equal.

In some embodiments, the processor is configured to determine disconnected components within the scenic graph when edges in a first point in the scenic path are not linked to any edge in a second point in the scenic path. The disconnected component is a portion of the scenic graph where the vertices and edges of the scenic path are not connected to the scenic graph.

In another aspect, one or more non-transitory computer-readable storage mediums configured with instructions executable by one or more processors to cause the one or more processors to perform a method for generating scenic routes through weighted two-dimensional (2D) points to visualize a movement of a user through the scenic routes with scenic views corresponding to a virtual environment is provided. The method includes receiving input data from an input data source. The input data includes at least one media content image including one or more points of interest (POIs). The method includes determining one or more scenic points in the input data by (i) selecting at least one of a pair of points in the one or more POIs, and (ii) identifying the one or more scenic points from each pair of points using coordinates and weights assigned to each point. The pair of points includes a first point, a second point, a first weight corresponding to the first point, and a second weight corresponding to the second point. The weight is assigned to each point based on a discretion of a user. The method includes generating one or more scenic paths for each scenic point of each pair of points based on a first condition. The first condition is the ratio of the first weight corresponding to the first point and a first distance of each scenic point from the second point is equal to the second weight corresponding to the second point and a second distance of each scenic point from the first point. The method includes generating a scenic graph by (i) determining intersection points ($I_p$) of each scenic path by partitioning each scenic path into one or more scenic edges at each intersection with other paths, (ii) determining edges ($E_p$) in each scenic path by identifying a length of arc between the intersection points of the one or more scenic paths and (iii) aggregating the intersection points and the edges of each scenic path. The method includes generating the scenic routes by applying any one of one or more route-generating methods on the scenic graph based on a second condition to visualize the movement of the user through the scenic routes with the scenic views corresponding to the virtual environment. The scenic view is an apparent weight of each scenic point. The apparent weight is equal to an actual weight of each scenic point in the scenic route by dividing a distance of the user from each scenic point in the scenic route.

The method and system generate a scenic route that satisfies a set of route generating conditions and helps the user to traverse the 2D space conveniently. The scenic routes are dynamically visualized based on the user's movement and proximity to scenic points. This real-time adjustment enhances the virtual experience. The method generates scenic paths using weight-to-distance ratios. This ensures that the scenic points selected are not only visually appealing but also optimally spaced for an uninterrupted and immersive experience. The method utilizes different route-generating methods to provide different types of virtual environments based on user requirements. This method can be widely applicable across different virtual platforms.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings in which:

FIG. 3A is an exemplary diagram of a scenic graph that is generated by a scenic graph generating module of FIG. 2 according to some embodiments herein;

FIG. 5 is a flow diagram that illustrates a method for generating scenic routes in two-dimensional (2D) space to visualize a movement of a user through the scenic routes with scenic views corresponding to a virtual environment according to some embodiments herein.

DETAILED DESCRIPTION OF THE DRAWINGS

Figure 1:
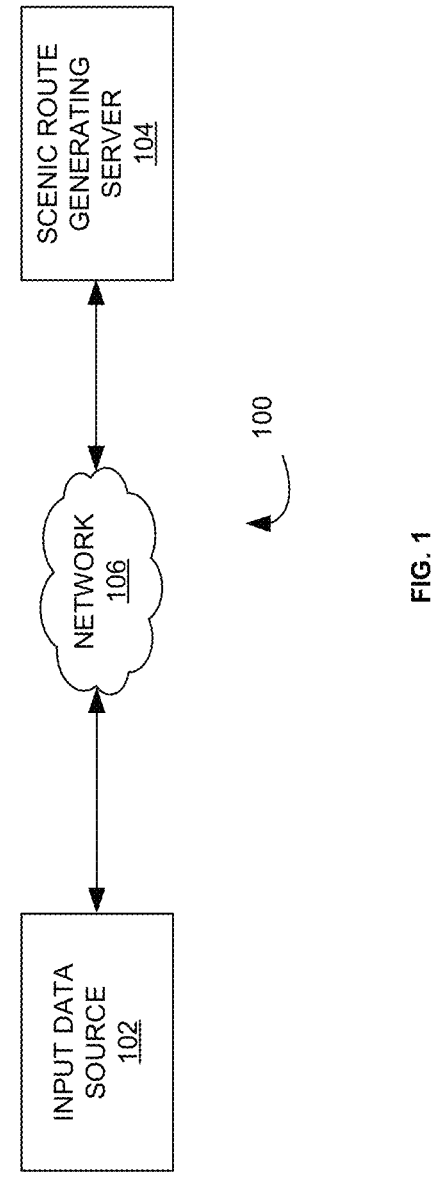
FIG. 1 is a block diagram of a system to generate scenic routes in two-dimensional (2D) space to visualize a movement of a user through the scenic routes with scenic views corresponding to a virtual environment according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system for finding scenic routes satisfying a set of route generating conditions in a 2-dimensional (2D) space. Embodiments herein provide a system and method for generating scenic routes in 2D space through weighted 2D points to visualize a movement of a user through the scenic routes with scenic views corresponding to a virtual environment. Referring now to the drawings, and more particularly to FIGS. 1 through 6, where similar reference characters denote corresponding features consistently throughout the figures, preferred embodiments are shown.

FIG. 1 is a block diagram of a system 100 to generate scenic routes in two-dimensional (2D) space to visualize a movement of a user through the scenic routes with scenic views corresponding to a virtual environment according to some embodiments herein. The system 100 includes an input data source 102, a scenic route generating server 104, and a network 106.

The scenic route generating server 104 includes a processor and a non-transitory computer-readable storage medium storing one or more sequences of instructions, which when executed by the processor causes the generation of the scenic routes in the 2D space. The scenic route generating server 104 may be a handheld device, a mobile phone, a kindle, a Personal Digital Assistant (PDA), a tablet, a music player, a computer, a laptop, an electronic notebook, or a Smartphone. The scenic route generating server 104 is configured to connect with the input data source 102 through the network 106. The network 106 is a wireless network or wired network. The network 106 may be a combination of a wired network and a wireless network. In some embodiments, network 106 is the Internet. The input data source 102 may be an image-capturing device or a camera.

The scenic route generating server 104 is configured to receive input data from the input data source 102 using the processor. The input data may include one or more media contents with one or more points of interest (POIs). The one or more media contents may be images with scenic places, city road image, Google map image, or any related images. The one or more POIs may be a location that has a special or particular interest or a useful site. The POIs may be tourist attractions, cultural, architectural, or recreational sites, scenic spots, or sites of historical or archaeological interest.

The scenic route generating server 104 is further configured to generate one or more scenic points in the 2D space in the input data. The scenic route generating server 104 may consider and select a set of first points, and a set of second points in the input data. Each point in the sets of first and second points has weight. Each scenic point is defined from a pair of points (for example, a pair of first-second points) in 2D space. The pair of points includes a first point, a second point, a first weight corresponding to the first point, and a second weight corresponding to the second point. The weight is assigned to each point based on the discretion of a user. Each of the scenic points is defined by its coordinates (x, y). The scenic route generating server 104 defines the one or more scenic points from each pair of first-second points by its coordinates (x, y) and weight ($w_p$) assigned to each point.

In some embodiments, the scenic route generating server 104 defines the one or more scenic points by considering a factor that the distance of a scenic point from a POI is indirectly proportional to the weight of the PoI. The scenic route generating server 104 generates one or more scenic paths for each pair of first-second points based on the weights of the first point, the second point, and distances of the scenic point from the first point, the second point. The scenic route generating server 104 generates the one or more scenic paths based on a first condition. The one or more scenic paths may be a circle or a line. The circle scenic path may be formed when the pair of first-second points have unequal weights. The line scenic path may be formed when the first condition is when the pair of first-second points have the same weight. The first condition is the ratio of the first weight corresponding to the first point and the first distance of each scenic point from the second point is equal to the second weight corresponding to the second point and the second distance of each scenic point from the first point.

The scenic route generating server 104 generates a scenic graph by partitioning each scenic path into scenic edges through its intersection with other scenic paths. The weight of each edge is the Cartesian distance between its endpoints or the length of the edge. The scenic route generating server 104 generates the scenic graph by combining all the edges. The scenic route generating server 104 may apply a scenic component bridging method on the generated scenic graph if the scenic graph has one or more disconnected components. The scenic route generating server 104 may add one or more additional edges to connect the one or more disconnected components with the scenic graph using the scenic component bridging method.

The scenic route generating server 104 generates a scenic route by applying one or more route generating methods on the scenic graph. The scenic route generating server 104 generates the scenic route based on a second condition. The second condition may include one or more conditions. The one or more conditions include (i) a route must consist of scenic paths and should not consist of any non-scenic (distracting) path, (ii) traveling on a route must allow one to have a view of a large number of first-second pairs or all first-second pairs, (iii) a route must not have a large number of edges and a large number of direction changes within the route, (iv) a route must contain a minimal number of repeated edges, where the repeated edges are defined as stretches of paths that must be travelled more than once (repeated) to complete the entire route, (v) the total route length that is the sum of all edges that are part of a route should be as low as possible. The one or more route-generating methods prioritize the plurality of conditions.

The one or more route generating methods to generate the scenic route may be at least one of (i) a first route generating method (ii) a second route-generating method, or (iii) a third route generating method. In some embodiments, the first route generating method is All Curve Convex Hull (ACCH) method. The scenic route generating server 104 may apply the ACCH method that generates the scenic route by selecting the shortest edge from each scenic path in the scenic graph and constructing the convex hull of the vertices of the selected edges.

In some embodiments, the second route generating method is the Dense Point Expansion (DPE) method. The scenic route generating server 104 may apply the DPE method that selects the scenic points from the scenic graph in the decreasing order of their degree (i.e. the number of edges that terminate at the scenic point) and constructs the convex hull of the vertices of the selected edges to create the scenic route.

In some embodiments, the third route generating method is All Curve Umbrella (ACU) method. The scenic route generating server 104 may apply the ACU method that generates the scenic route by selecting the shortest edge from each scenic path in the scenic graph and connecting the edges.

In some embodiments, the scenic route generating server 104 selects the scenic route that satisfies the second condition. The scenic route generating server 104 may not prefer a route that satisfies fewer conditions, instead of all the second condition. The scenic route generating server 104 generates the scenic route through the weighted 2D scenic points when the route satisfies the second condition with scenic beauty.

For example, the scenic route generating server 104 is further configured to receive input data, including media content images with points of interest (POIs) like a statue (coordinates (1, 2), weight 5), a fountain (coordinates (4, 5), weight 8), and a flower bed (coordinates (7, 8), weight 6). The scenic route generating server 104 is further configured to determine scenic points by selecting pairs of POIs and identifying scenic points using their coordinates and weights. For example, a scenic point D (coordinates (2, 3)) is identified for the pair of statue and fountain. The scenic route generating server 104 is further configured to generate scenic paths for each scenic point, such as the path from the statue to D to the fountain. The scenic route generating server 104 is further configured to generate a scenic graph by determining intersection points (e.g., E) where paths intersect and edges (lengths of arcs between intersections). The points and edges are aggregated to form the scenic graph. The scenic route generating server 104 is further configured to generate scenic routes by applying route-generating methods on the scenic graph based on conditions like minimizing scenic edges or ensuring the shortest path, resulting in a scenic route such as statue→D→E→flower bed. The scenic route generating server 104 is further configured to visualize the user's movement through the scenic routes with scenic views corresponding to the virtual environment, showing the apparent weight of each scenic point based on the user's distance.

Figure 2:
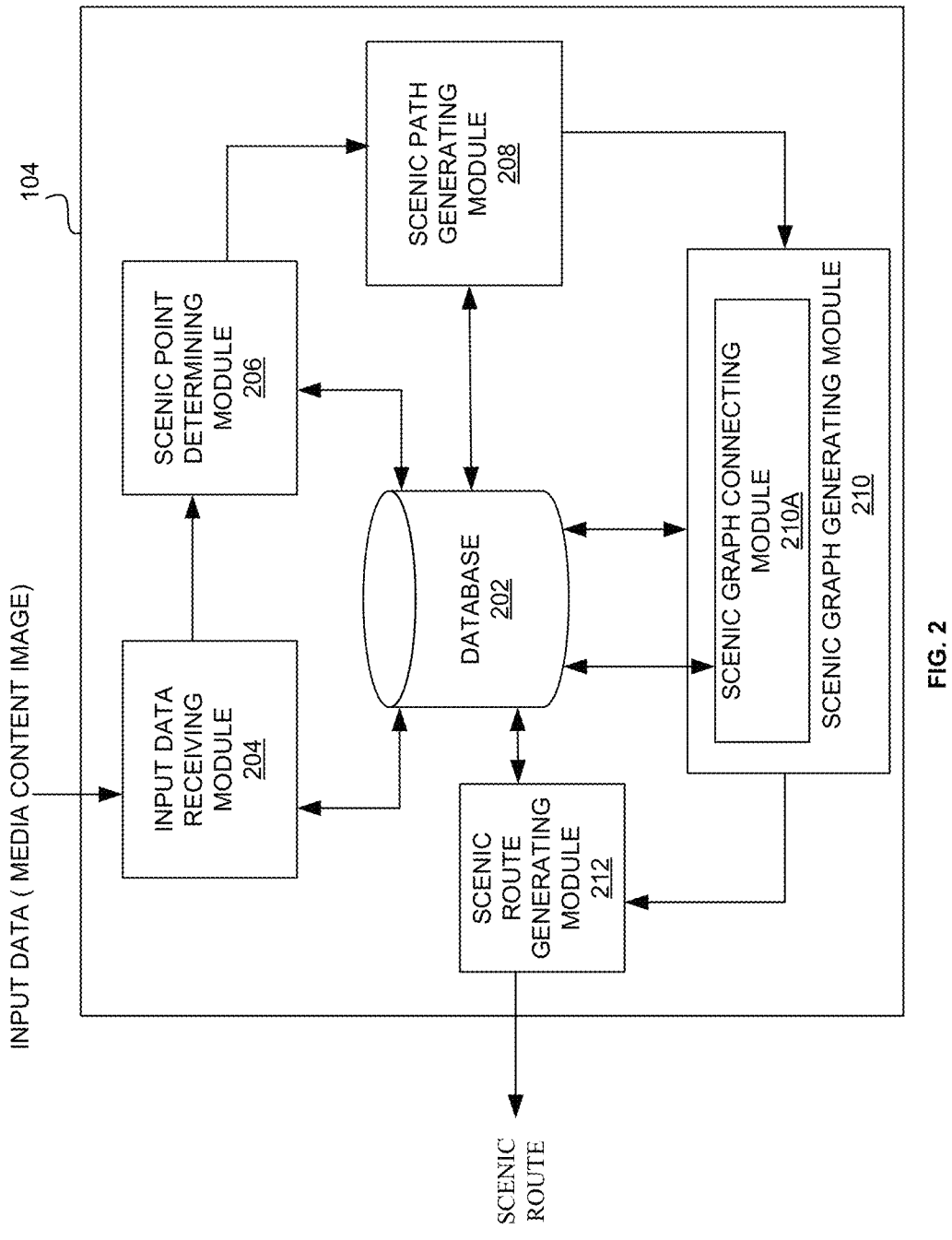
FIG. 2 is an exploded view of a scenic route generating server of FIG. 1 according to some embodiments herein.

FIG. 2 is an exploded view of a scenic route generating server 104 of FIG. 1 according to some embodiments herein. The scenic route generating server 104 includes a database 202, an input data receiving module 204, a scenic point determining module 206, a scenic path generating module 208, a scenic graph generating module 210, a scenic graph connecting module 210A, and a scenic route generating module 212.

The database 202 stores a set of modules of the scenic route generating server 104 that are executed by the processor for generating a scenic route. The input data receiving module 204 receives input data from the input data source 102. The input data may include one or more media contents with one or more points of interest (POIs).

The scenic point determining module 206 determines one or more scenic points in a two-dimensional (2D) space by considering a set of first points, and a set of second points in the input data, and defining the one or more scenic points from each pair of first-second points by its coordinates (x, y) and weight ($w_p$) assigned to each point. For example, a point $r_i$ in a set of first points (R) has weight $w_{ri}$ and a point $b_i$ in a set of second points (B) has weight $w_{bi}$. The one or more scenic points may be two-dimensional points. In some embodiments, the scenic point determining module 206 defines the one or more scenic points by considering the factor that the distance of a scenic point from a point of interest (POI) is indirectly proportional to the weight of the PoI.

The scenic path generating module 208 generates one or more scenic paths for each scenic point (p), i.e., for each pair of the first-second points. The scenic path generating module 208 generates a corresponding scenic path (C) for each scenic point (p) of each pair of first-second points using a first condition as follows:

$$w1d2 = w2d1 \text{ or } \frac{w1}{d1} = \frac{w2}{d2},$$

where w1 is the weight of the first point, d1 is the distance of the scenic point from the first point, w2 is the weight of the second point, and d2 is the distance of the scenic point from the second point. The scenic path generating module 208 generates the one or more scenic paths for all combinations of (ri, bj) based on the first condition, such that ri ∈ R, bj∈ B, is C. The one or more scenic paths may be a circle or a line. The scenic path generating module 208 generates the circle scenic path when the pair of scenic points have unequal weights. The scenic path generating module 208 generates the line scenic path when the pair of scenic points have the same weight. In some embodiments, the scenic path generating module 208 generates the scenic path between the first point and the second point by forming the perpendicular bisectors to the line joining the first point and the second point.

The scenic graph generating module 210 generates a scenic graph by partitioning each scenic path into scenic edges through its intersection with other scenic paths. The scenic graph generating module 210 generates the scenic path by combining all the edges. For example, the pair of points (first and second points) where each scenic path intersect is $I_P$. The length of the arc between two consecutive intersection points forms an edge set $E_C$, which contributes to the edges of a particular scenic path. The edges between the intersection points of all the scenic paths form the edge set $E_P$. The weight of each edge is the Cartesian distance between its endpoints or the length of the edge. The scenic graph over all the intersection points is G ($I_P$, $E_P$). For a selected route: the set of points on a route is set as S⊆$I_P$, and the edges within the route are E⊆$E_P$. A scenic route is represented as a graph using the notation: G (S, E).

In some embodiments, the scenic graph generating module 210 removes distant intersection points from the set of $I_P$s using a bounding box around the set of first and second points. The bounding box may not need to be a minimum bounding box and may be made larger or smaller by some quantity δ.

The scenic graph connecting module 210A applies a scenic component bridging method on the scenic graph that is generated by the scenic graph generating module 210 if the scenic graph has one or more disconnected components. That is a pair of points such that a path that involves the existing edges cannot join the two points. The graph connecting module 212 adds one or more additional edges to connect the one or more disconnected components with the scenic graph using the scenic component bridging method.

The scenic route generating module 212 generates a scenic route from the scenic graph G ($I_P$, $E_P$) that is generated by the scenic graph generating module 210 using at least one route generating method based on a second condition. The second condition may include one or more conditions. The one or more conditions include (i) a route must consist of scenic paths and any non-scenic (distracting) path must be avoided, (ii) travelling on a route must allow one to have a view of a large number of first-second pairs or all first-second pairs, (iii) a route must not have a large number of edges and there should not be a large number of direction changes within a route, (iv) a route must contain a minimal number of repeated edges, where the repeated edges are defined as stretches of paths that must be travelled more than once (repeated) to complete the entire route, and (v) the total route length that is the sum of all edges that are part of a route should be as low as possible.

The route generating method may generate the scenic route by coupling the edges of the scenic graph G ($I_P$, $E_P$) satisfying the second condition. The route generating method may be at least one of a first route generating method, a second route generating method, or a third route generating method.

The first, second, and third route generating methods take the scenic graph G($I_P$, $E_P$) as input, where $I_P$ is the set of all intersection points of the paths, and $E_P$ is the set of edges between these intersection points. The first, second, and third route generating methods require the shortest path that connects a pair of points. The shortest path may be computed using the Floyd-Warshall all-pairs shortest path method. APSP (a, b) denotes the distance between two points taken from the pre-computed results of the Floyd-Warshall method on (IP, E).

In some embodiments, the scenic route generating module 214 applies the first route generating method that selects the intersection points to be considered and connects the selected intersection points to create a closed scenic route. In some embodiments, the first route generating method is all curve convex hull (ACCH) method.

Initially, the first route generating method selects the shortest edge from each scenic path or curve in the scenic graph and inserts all the edges into E, and all the edge endpoints into S i.e., (1) E: set including of the shortest edge belonging to each path/curve present in the set C of graph G(IP, EP); and (2) S: set of endpoints of all edges e: e∈ E.

The first route generating method selects the shortest edge from each scenic path/curve in the scenic graph. Further, the first route generating method generates the Convex Hull of S. It is considered that the sequence of points given by the convex hull is Λ. The first route generating method connects every two consecutive points in the sequence Λ using the edges specified by the APSP between each of those two points. While joining the sequence Λ using the paths specified by the APSP array, the first route generating method checks if the two endpoints of each edge in the APSP are already connected, and adds the edges to combine the two endpoints if the two endpoints of each edge are not connected. The first route generating method further connects each disconnected component with the closest disconnected component using the edges specified by the APSP, if disconnected components remain in the new graph.

In some embodiments, the scenic route generating module 214 applies the second route generating method that selects the intersection points from the scenic graph in the decreasing order of their degree (i.e. the number of edges that terminate at the scenic point), and constructs the convex hull of the vertices of the selected edges to create the scenic route. In some embodiments, the second route generating method is the dense point expansion (DPE) method.

Initially, the second route generating method takes the set of all intersection points in the original graph $I_P$ and sorts the intersection points in the descending order of their degree. If two points have the same degree, the second route generating method further sorts the two points in the ascending order based on the sum of edges that terminate at each point. This step is performed as vertices of the same degree may be extremely far away from the main portion of the graph, occasionally leading to such vertices being picked, which in turn may result in the creation of longer paths. S and E are empty sets that will finally contain the final set of vertices and edges respectively.

The second route generating method selects the intersection point with the highest degree in $I_P$, i.e., $I_0$, and checks if the edge lies on a curve already covered by an edge in E for each edge terminating at $I_0$. If the edge does not lie on a curve already covered by the edge in E, the second route generating method adds the edge to E, and $I_0$ and the other endpoint of the edge in S. Further, the second route generating method generates the convex hull of S. It is considered that the sequence of points given by the convex hull is Λ. Further, the second route generating method connects every two consecutive points in the sequence Λ using the edges specified by the APSP between each of these two points. If disconnected components remain in the new graph, the second route generating method connects each disconnected component with its closest disconnected component using APSP.

In some embodiments, the scenic route generating module 214 applies the third route generating method that generates the scenic route by selecting the shortest edge from each scenic path in the scenic graph and connecting the edges. In some embodiments, the third route generating method is all-curve umbrella (ACU) method.

Initially, the third route generating method selects the shortest edge from each scenic path/curve in the scenic graph and inserts all the edges into E, and all the edge endpoints into S i.e., (1) E: set including the shortest edge belonging to each path/curve present in the set C of graph G(IP, EP); and (2) S: set of endpoints of all edges e: e∈ E.

The third route generating method calculates the centroid (g) of the points g(xg, yg) in S using the following formula:

$$g = \left( \frac{\sum_i x_i}{|S|}, \frac{\sum_i y_i}{|S|} \right), i \in [1, |S|], i \in \mathbb{N}$$

Where si=(xi, yi), s∈ S. (xi and yi are the x and y coordinates of a point si that belongs to the set S).

The third route-generating method takes the edges and sorts the edges based on the angle formed by the line joining the midpoint of the edge endpoints and (xg, yg), and the line parallel to the X-axis. The third route generating method iterates through list E based on the angle and connects each edge in the list E with the next edge by finding the closest endpoint from the next edge using the paths specified by the APSP array. In this way, the third route generating method builds a circular route around a central point that provides the user with a systematic well-defined order to cover all the edges in E.

The third route generating method arranges the edges in E in a circular manner around g (the points in S may be sorted in either ascending or descending order, depending on whether the arrangement of the edges in a clockwise or anticlockwise order) with the anticlockwise angle formed between the midpoint of the edge in E and g, and the line y=yg.) and considers this sequence Γ.

The third route generating method further loops over the edges and joins the edges. For example, the notation e11 and e12 are used to denote the endpoints of the edges that are currently dealing with, and the notation e21 and e22 are used to denote the endpoints of the next edge in the sequence Γ.

If the edge is the first edge of Γ, the third route generating method checks all four combinations i.e. e11-e21, e11-e22, e12-e21, e12-e22, and adds the edges corresponding to the APSP between the pair of points closest to each other. If the edge is neither the first nor last edge of Γ, the third route generating method considered that the endpoint of the current edge that is connected to the previous edge is e11 without loss of generality. The third route generating method adds the edges corresponding to the APSP between the points of the closest pair in e12-e21 and e12-e22.

If the edge is the last edge of Γ, the third route generating method considered that without loss of generality, the endpoint of the current edge that is connected to the previous edge is e11, and the endpoint of the first edge in Γ that is already connected is e21. The third route generating method adds the edges corresponding to the APSP between the pair e12-e22.

The third route generating method further loops over the edges and joins the edges in clockwise and anticlockwise order. The third route generating method picks the route that has the minimum path length out of the two results.

Thus, the scenic route generating module 214 applies the first route generating method, the second route generating method, or the third route generating method to generate the scenic route in such a manner that the scenic route satisfies the second condition.

FIG. 3A is an exemplary diagram of a scenic graph 300A that is generated by a scenic graph generating module 210 of FIG. 2 according to some embodiments herein. In the scenic graph 300A, r1 represents a first point, and b1, b2, and b3 represent a set of second point. C1, C2, and C3 represent circular scenic paths that are generated using the first condition. The first condition may be a scenic path-generating formula. Each scenic path is partitioned into scenic edges through its intersection with other scenic paths. In the scenic graph 300A, Ip=$\{I_P0, I_P1, I_P2, I_P3, I_P4,$ and $I_P5\}$ represent intersection points ($I_P$). The edges 302A-L between the intersection points of all the circular scenic paths C1-C3 form an edge set EP. In the scenic graph 300A, $E_P=\{[I_P0 \frown I_P1], [I_P1 \frown I_P3], [I_P3 \frown I_P5], [I_P5 \frown I_P0],$
$[I_P \frown I_P2], [I_P2 \frown I_P3], [I_P3 \frown I_P4], [I_P4 \frown I_P0],$
$[I_P4 \frown I_P1], [I_P1 \frown I_P2], [I_P2 \frown I_P5], [I_P5 \frown I_P4]\}$. The corresponding scenic graph over the intersection points is G ($I_P$, $E_P$).

Figure 3B:
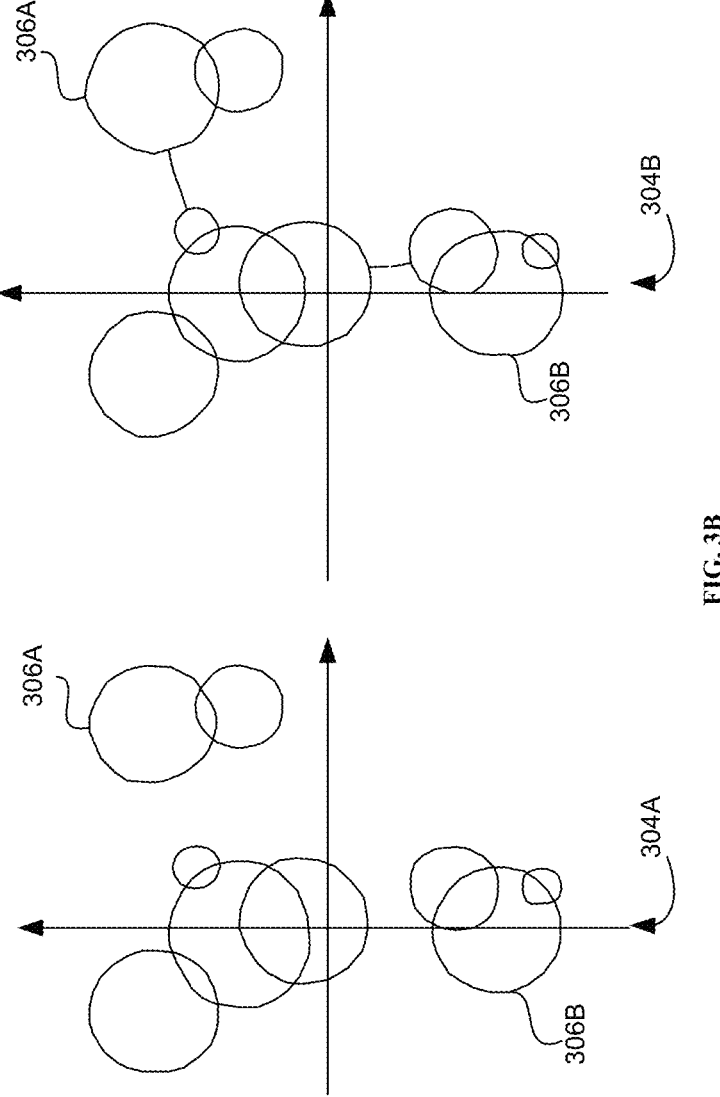
FIG. 3B is an exemplary diagram that represents a scenic graph generation by a scenic graph generating module of FIG. 2 according to some embodiments herein.

FIG. 3B is an exemplary diagram that represents a scenic graph generation by a scenic graph generating module 210 of FIG. 2 according to some embodiments herein. In FIG. 3B, 304A represents a scenic graph that is generated by the scenic graph generating module 210. The scenic graph 304A includes disconnected components 306A and 306B. The graph connecting module 210A may apply a scenic component bridging method on the scenic graph 304A and connect the disconnected components 306A, and 306B by adding additional edges. In FIG. 3B, 304B represents a resultant scenic graph, where the disconnected components 306A, and 306B are connected.

Figures 4A, 4B, 4C, 4D:
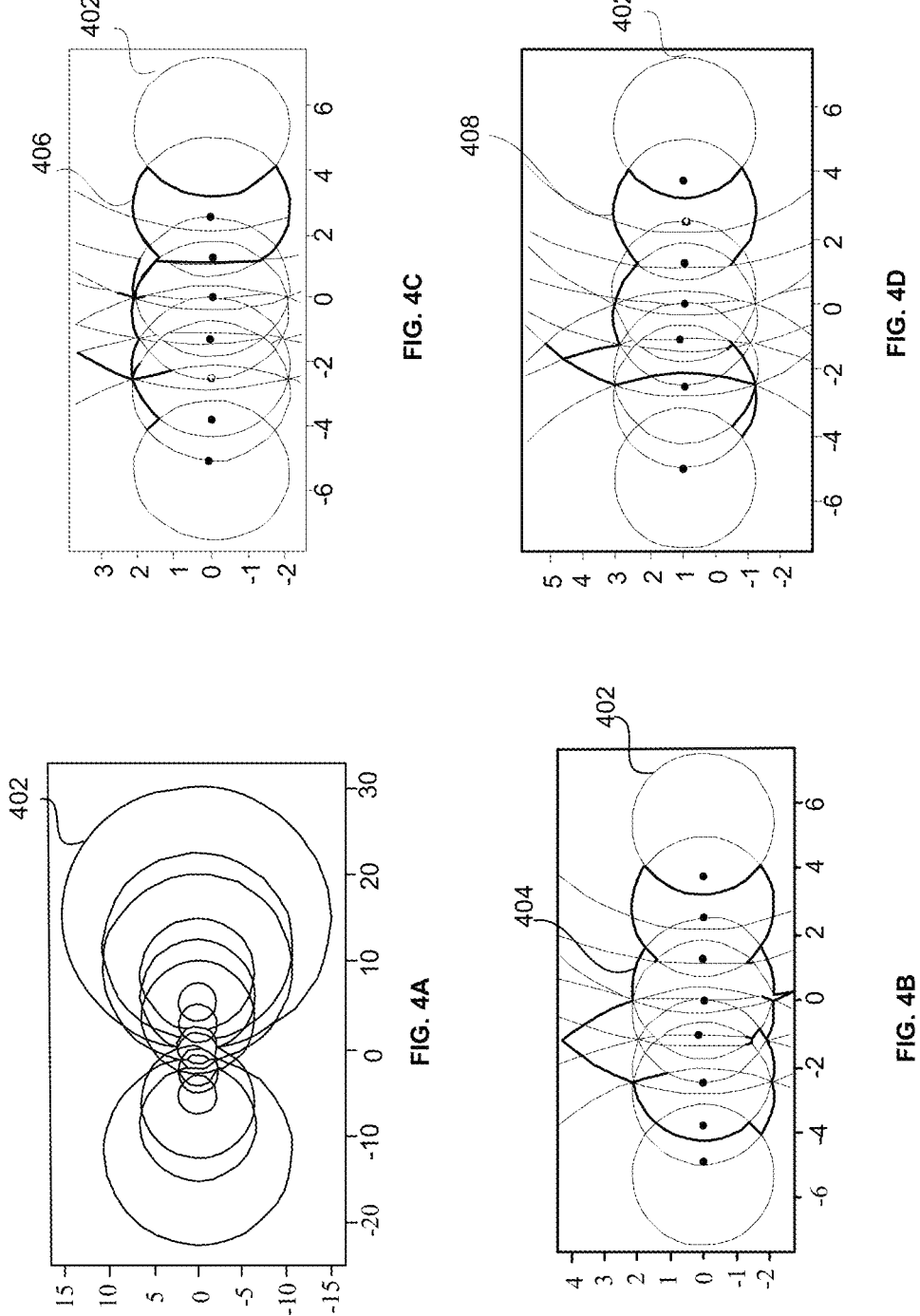
FIGS. 4A-4D are exemplary diagrams that represent a scenic route generation by a scenic route generating server of FIG. 2 according to some embodiments herein.

FIGS. 4A-4D are exemplary diagrams that represent a scenic route generation by a scenic route generating server 104 of FIG. 2 according to some embodiments herein. In FIG. 4A, a set of points are organised in a line, with alternating first and second points using a scenic point defining module 204, and a corresponding scenic graph 402 is generated by a scenic path generating module 206, and a scenic graph generating module 208. In FIG. 4B, a dark line 404 represents a route that is generated by a first routing method (i.e. an all-curve convex hull (ACCH) method) on the scenic graph 402. In FIG. 4C, a dark line 406 represents a route that is generated by a second routing method (i.e. a dense point expansion (DPE) method) on the scenic graph 402. In FIG. 4D, a dark line 408 represents a route that is generated by a third routing method (i.e. all curve umbrella (ACU) method) on the scenic graph 402.

FIG. 5 is a flow diagram that illustrates a method for generating scenic routes through weighted two-dimensional (2D) points to visualize a movement of a user through the scenic routes with scenic views corresponding to a virtual environment according to some embodiments herein. At step 502, the method includes receiving input data from an input data source. The input data includes at least one media content image including one or more points of interest (POIs).

At step 504, the method includes determining one or more scenic points in the input data by (i) selecting at least one of a pair of points in the one or more POIs, and (ii) identifying the one or more scenic points from each pair of points using coordinates and weights assigned to each point. The pair of points includes a first point, a second point, a first weight corresponding to the first point, and a second weight corresponding to the second point. The weight is assigned to each point based on a discretion of a user. At step 506, the method includes generating one or more scenic paths for each scenic point of each pair of points based on a first condition. The first condition is the ratio of the first weight corresponding to the first point and a first distance of each scenic point from the second point is equal to the second weight corresponding to the second point and a second distance of each scenic point from the first point.

At step 508, the method includes generating a scenic graph by (i) determining intersection points ($I_p$) of each scenic path by partitioning each scenic path into one or more scenic edges at each intersection with other paths, (ii) determining edges ($E_p$) in each scenic path by identifying a length of arc between the intersection points of the one or more scenic paths and (iii) aggregating the intersection points and the edges of each scenic path.

At step 510, the method includes generating the scenic routes by applying any one of one or more route-generating methods on the scenic graph based on a second condition to visualize the movement of the user through the scenic routes with the scenic views corresponding to the virtual environment. The scenic view is an apparent weight of each scenic point. The apparent weight is equal to the actual weight of each scenic point in the scenic route by dividing the distance of the user from each scenic point in the scenic route.

Figure 6:
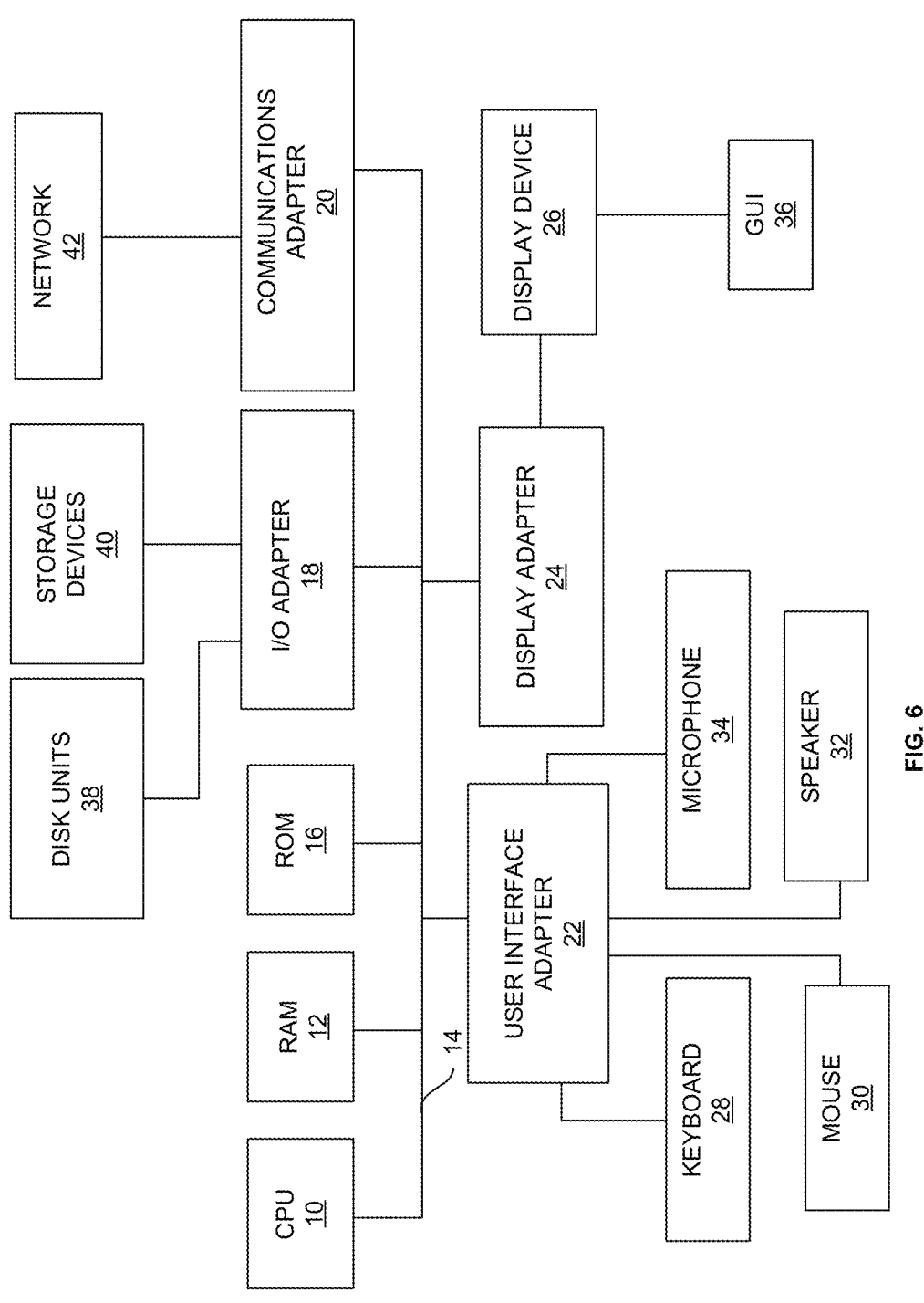
FIG. 6 is a schematic diagram of a computer architecture in accordance with the embodiments herein.

A representative hardware environment for practicing the embodiments herein is depicted in FIG. 6, with reference to FIGS. 1 through 5. This schematic drawing illustrates a hardware configuration of a scenic route generating server 104/computer system/computing device in accordance with the embodiments herein. The system includes at least one processing device CPU 10 that may be interconnected via system bus 15 to various devices such as a random-access memory (RAM) 12, read-only memory (ROM) 16, and an input/output (I/O) adapter 18. The I/O adapter 18 can connect to peripheral devices, such as disk unit 58 and program storage devices 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user input. Additionally, a communication adapter 20 connects the bus 15 to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for generating optimized scenic routes through weighted two-dimensional (2D) points to optimally traverse and visualize a movement of a user through the scenic routes with scenic views corresponding to a virtual environment, wherein the method comprising:

receiving, input data from an input data source, wherein the input data comprises at least one media content image comprising a plurality of points of interest (POIs);

computing, a plurality of scenic points in the input data by (i) selecting at least one of a pair of points in the plurality of POIs, and (ii) identifying the plurality of scenic points from each pair of points using coordinates and weights assigned to each point, wherein the pair of points comprises a first point, a second point, a first weight corresponding to the first point, and a second weight corresponding to the second point, wherein the weight is assigned to each point based on a discretion of a user;

generating, a plurality of scenic paths for each scenic point of each pair of points based on a first condition, wherein the first condition is the ratio of the first weight corresponding to the first point and a first distance of each scenic point from the second point is equal to the second weight corresponding to the second point and a second distance of each scenic point from the first point;

constructing using a scenic graph generating module executed by the processor a scenic graph by (i) determining intersection points (Ip) of each scenic path by partitioning each scenic path into a plurality of scenic edges at each intersection with other paths, (ii) determining edges (Ep) in each scenic path by identifying a length of arc between the intersection points of the plurality of scenic paths and (iii) aggregating the intersection points and the edges of each scenic path; and generating the scenic routes by applying a plurality of route-generating methods on the scenic graph based on a plurality of conditions to visualize the movement of the user through the scenic routes with the scenic views corresponding to the virtual environment, wherein the plurality of conditions comprises (i) a route comprises minimum number of scenic edges and directional changes, and (ii) the route comprise a minimum number of repeated scenic edges means minimizing the number of scenic edges that are traversed multiple times to complete the scenic route wherein the scenic view is an apparent weight of each scenic point, wherein the apparent weight is equal to an actual weight of each scenic point in the scenic route by dividing a distance of the user from each scenic point in the scenic route, wherein the scenic routes are dynamically visualized based on the movement of the user and proximity to scenic points.

2. The processor-implemented method of claim 1, wherein the plurality of conditions further comprises (i) the route comprising scenic paths and non-scenic paths, (ii) the route comprises viewable pairs of points, and (iii) the route comprises a shortest path by summing a combination of scenic edges with the shortest path to the scenic route, wherein the plurality of route-generating methods prioritize the plurality of conditions.

3. The processor-implemented method of claim 2, wherein the method further comprises computing the shortest path using Floyd-Warshall all-pairs shortest path method, wherein the shortest path is computed by calculating a distance between two points that are selected from precomputed intersection points and edges of each scenic graph of the Floyd-Warshall all-pairs shortest path method.

4. The processor-implemented method of claim 1, wherein the method further comprises generating, using a first route-generating method, the scenic routes by (i) selecting the combination of scenic edges with the shortest path from each scenic path, and (ii) constructing a convex hull to vertices in the combination of scenic edges.

5. The processor-implemented method of claim 1, wherein the plurality of scenic points is selected when a distance of a scenic point from a POI is indirectly proportional to the weight of the corresponding POI.

6. The processor-implemented method of claim 1, wherein the method further comprises generating, using a second route-generating method, the scenic routes by (i) selecting the plurality of scenic points within the scenic graph in descending order of degree of intersection points, which is the number of scenic edges terminating at each scenic point if the plurality of scenic points within the scenic graph comprises different degrees, and (ii) constructing a convex hull to vertices of the selected scenic points.

7. The processor-implemented method of claim 1, wherein the method further comprises generating, using a third route-generating method, the scenic routes by (i) calculating a centroid of the plurality of scenic points in the scenic graph (ii) assigning the plurality of scenic points in a circular order to the centroid, and (iii) connecting the plurality of scenic points in the circular order with the shortest path between each scenic point.

8. The processor-implemented method of claim 7, wherein the third route-generating method selects the plurality of scenic points within the scenic graph in the descending order of degree which is the number of scenic edges terminating at each scenic point if the plurality of scenic points within the scenic graph comprise the same degree.

9. The processor-implemented method of claim 1, wherein the method comprises generating a circle path if the weights assigned to each pair of points are different, wherein the method comprises generating a line scenic path if the weights assigned to each pair of points are equal.

10. The processor-implemented method of claim 1, wherein the method further comprises determining disconnected components within the scenic graph when edges in a first point in the scenic path are not linked to any edge in a second point in the scenic path, wherein the disconnected component is a portion of the scenic graph where vertices and edges of the scenic path are not connected to the scenic graph.

11. The processor-implemented method of claim 10, wherein the method further comprises adding a plurality of additional vertices and a plurality of additional edges to connect the disconnected components with the scenic graph by applying a scenic component bridging method on the generated scenic graph if the scenic graph has the disconnected components.

12. A system for generating optimized scenic routes through weighted two-dimensional (2D) points to optimally traverse and visualize a movement of a user through the scenic routes with scenic views corresponding to a virtual environment, wherein the system comprises:

a scenic route generating server receives input data from an input data source, wherein the input data comprises at least one media content image comprising a plurality of points of interest (POIs), wherein the scenic route generating server comprises, a memory that stores a set of instructions; and a processor that executes the set of instructions and is configured to, computing, a plurality of scenic points in the input data by (i) selecting at least one of a pair of points in the plurality of POIs, and (ii) identifying the plurality of scenic points from each pair of points using coordinates and weights assigned to each point, wherein the pair of points comprises a first point, a second point, a first weight corresponding to the first point, and a second weight corresponding to the second point, wherein the weight is assigned to each point based on a discretion of a user;

generating, a plurality of scenic paths for each scenic point of each pair of points based on a first condition, wherein the first condition is the ratio of the first weight corresponding to the first point and a first distance of each scenic point from the second point is equal to the second weight corresponding to the second point and a second distance of each scenic point from the first point;

constructing using a scenic graph generating module executed by the processor a scenic graph by (i) determining intersection points (Ip) of each scenic path by partitioning each scenic path into a plurality of scenic edges at each intersection with other paths, (ii) determining edges (E$_p$) in each scenic path by identifying a length of arc between the intersection points of the plurality of scenic paths and (iii) aggregating the intersection points and the edges of each scenic path; and generating the scenic routes by applying a plurality of route-generating methods on the scenic graph based on a plurality of conditions to visualize the movement of the user through the scenic routes with the scenic views corresponding to the virtual environment, wherein the plurality of conditions comprises (i) a route comprises minimum number of scenic edges and directional changes, and (ii) the route comprise a minimum number of repeated scenic edges means minimizing the number of scenic edges that are traversed multiple times to complete the scenic route wherein the scenic view is an apparent weight of each scenic point, wherein the apparent weight is equal to an actual weight of each scenic point in the scenic route by dividing a distance of the user from each scenic point in the scenic route, wherein the scenic routes are dynamically visualized based on the movement of the user and proximity to scenic points.

13. The system of claim 12, wherein the plurality of conditions further comprises (i) the route comprising scenic paths and non-scenic paths, (ii) the route comprises viewable pairs of points, and (iii) the route comprises a shortest path by summing a combination of scenic edges with the shortest path to the scenic route, wherein the plurality of route-generating methods prioritize the plurality of conditions.

14. The system of claim 12, wherein the processor is configured to generate, using a first route-generating method, the scenic routes by (i) selecting the combination of scenic edges with the shortest path from each scenic path, and (ii) constructing a convex hull to vertices in the combination of scenic edges.

15. The system of claim 12, wherein the plurality of scenic points is selected when a distance of a scenic point from a POI is indirectly proportional to the weight of the corresponding POI.

16. The system of claim 12, wherein the processor is configured to generate, using a second route-generating method, the scenic routes by (i) selecting the plurality of scenic points within the scenic graph in descending order of degree of intersection points, which is the number of scenic edges terminating at each scenic point if the plurality of scenic points within the scenic graph comprises different degrees, and (ii) constructing a convex hull to vertices of the selected scenic points.

17. The system of claim 12, wherein the processor is configured to generate, using a third route-generating method, the scenic routes by (i) calculating a centroid of the plurality of scenic points in the scenic graph (ii) assigning the plurality of scenic points in a circular order to the centroid, and (iii) connecting the plurality of scenic points in the circular order with the shortest path between each scenic point.

18. The system of claim 17, wherein the third route-generating method selects the plurality of scenic points within the scenic graph in the descending order of degree which is the number of scenic edges terminating at each scenic point if the plurality of scenic points within the scenic graph comprises the same degree.

19. The system of claim 12, wherein the processor is configured to generate a circle scenic path if the weights assigned to each pair of points are different, wherein the method comprises generating a line scenic path if the weights assigned to each pair of points are equal.

20. One or more non-transitory computer-readable storage mediums storing one or sequences of instructions, which when executed by one or more processors, causes a method for generating optimized scenic routes through weighted two-dimensional (2D) points to optimally traverse and visualize a movement of a user through the scenic routes with scenic views corresponding to a virtual environment, wherein the method comprising:

receiving, input data from an input data source, wherein the input data comprises at least one media content image comprising a plurality of points of interest (POIs);

computing, a plurality of scenic points in the input data by (i) selecting at least one of a pair of points in the plurality of POIs, and (ii) identifying the plurality of scenic points from each pair of points using coordinates and weights assigned to each point, wherein the pair of points comprises a first point, a second point, a first weight corresponding to the first point, and a second weight corresponding to the second point, wherein the weight is assigned to each point based on a discretion of a user;

generating, a plurality of scenic paths for each scenic point of each pair of points based on a first condition, wherein the first condition is the ratio of the first weight corresponding to the first point and a first distance of each scenic point from the second point is equal to the second weight corresponding to the second point and a second distance of each scenic point from the first point;

constructing using a scenic graph generating module executed by the processor a scenic graph by (i) determining intersection points (Ip) of each scenic path by partitioning each scenic path into a plurality of scenic edges at each intersection with other paths, (ii) determining edges ($E_p$) in each scenic path by identifying a length of arc between the intersection points of the plurality of scenic paths and (iii) aggregating the intersection points and the edges of each scenic path; and generating the scenic routes by applying a plurality of route-generating methods on the scenic graph based on a plurality of condition to visualize the movement of the user through the scenic routes with the scenic views corresponding to the virtual environment, wherein the plurality of conditions comprises (i) a route comprises minimum number of scenic edges and directional changes, and (ii) the route comprise a minimum number of repeated scenic edges means minimizing the number of scenic edges that are traversed multiple times to complete the scenic route wherein the scenic view is an apparent weight of each scenic point, wherein the apparent weight is equal to an actual weight of each scenic point in the scenic route by dividing a distance of the user from each scenic point in the scenic route, wherein the scenic routes are dynamically visualized based on the movement of the user and proximity to scenic points.

* * * * *